No. 726,047. PATENTED APR. 21, 1903.
G. GRAHAM.
SHAFT COUPLING.
APPLICATION FILED AUG. 11, 1902.
NO MODEL.
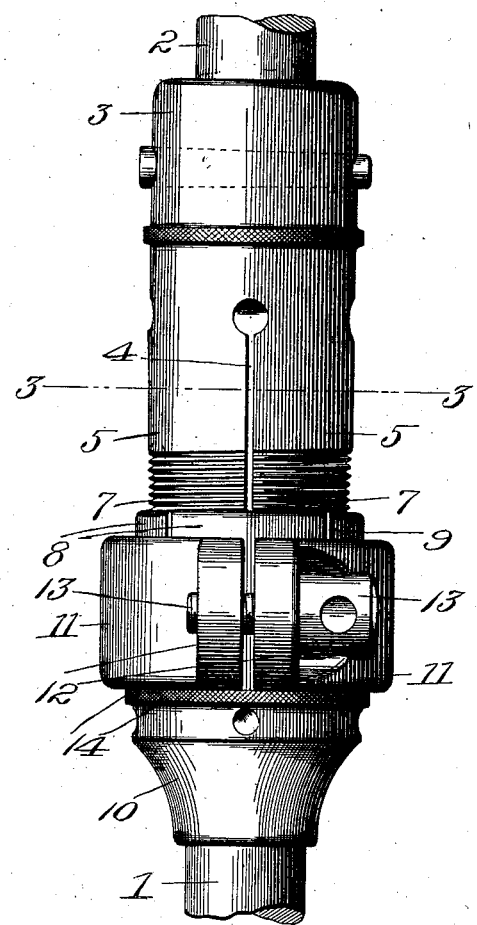
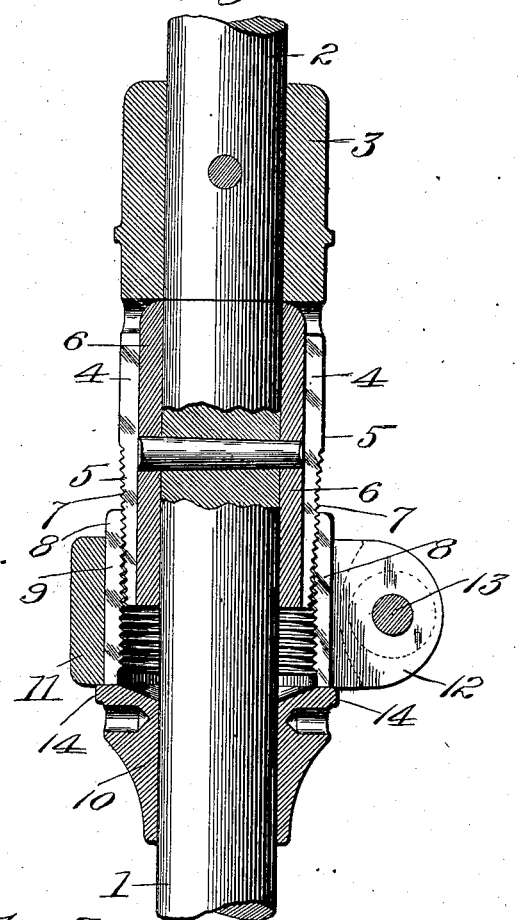
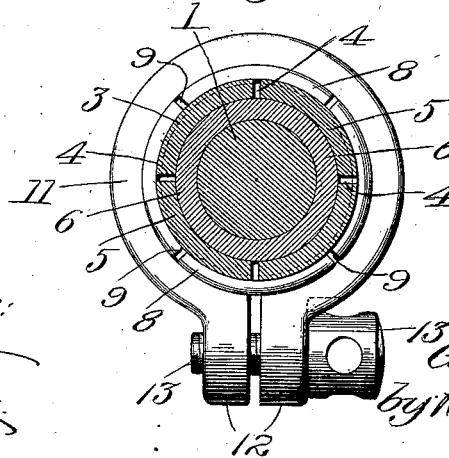
Witnesses:
Inventor:
George Graham,
by Bakewell Cornwall
Attys.

UNITED STATES PATENT OFFICE.

GEORGE GRAHAM, OF ST. LOUIS, MISSOURI.

SHAFT-COUPLING.

SPECIFICATION forming part of Letters Patent No. 726,047, dated April 21, 1903.

Application filed August 11, 1902. Serial No. 119,265. (No model.)

*To all whom it may concern:*

Be it known that I, GEORGE GRAHAM, a citizen of the United States, residing at St. Louis, Missouri, have invented a certain new and useful Improvement in Shaft-Couplings, of which the following is a full, clear, and exact description, such as will enable others skilled in the art to which it appertains to make and use the same, reference being had to the accompanying drawings, forming part of this specification, in which—

Figure 1 is a side elevation. Fig. 2 is a view chiefly in central vertical sectional elevation; and Fig. 3 is a top view, partly in section, on the line 3 3 of Fig. 1.

My invention relates to improvements in shaft-coupling, and more particularly to such devices in which a member carried by one rotatable part frictionally engages another rotatable part, whereby under normal conditions motion is transmitted from one of said parts to the other thereof, while should the driven member become clogged the driving member can operate without effecting movement of said driven member.

My object is to provide a construction by means of which the parts are evenly clamped and even wear and satisfactory operation are insured.

To these ends and also to improve generally upon devices of the character indicated my invention consists in the various matters hereinafter described and claimed.

The present invention is particularly applicable for driving the feeding-shaft of nailing-machines; but the invention is in no wise limited to such use and will be found of advantage in many machines.

Referring now more particularly to the drawings, 1 represents the driving-shaft, and 2 the driven shaft, the said shafts being in alinement with each other and preferably having their ends abutting one against the other. A collar 3, pinned or otherwise fastened to the driven shaft to rotate therewith, has a longitudinal opening adapted to receive the end of the driving-shaft and is provided with longitudinal kerfs 4, by means of which are produced spring-fingers or clamping-sections 5, the said fingers or clamping-sections surrounding the said driving-shaft, whereby they can bear evenly upon the same over substantially its entire circumference. Manifestly the said fingers can either directly engage the said driving-shaft or a bushing 6 can be pinned or otherwise fastened upon the said shaft, and this bushing can be engaged by the said fingers. The end of the collar provided with the fingers has its outer surface tapered and threaded, as shown at 7, and the said end is received in an internally tapered and threaded sleeve 8, which is provided with longitudinal kerfs 9 to permit compression of the said collar about the said fingers. Connected to the split portion of the sleeve is what may be termed a "body portion" 10, which is provided with a central opening in which the driving-shaft is somewhat snugly received, the sleeve having the necessary rotation about the said shaft and being guided in its movement by the shaft. A split clamping-ring 11 encircles the split portion of said sleeve and is provided with lugs 12, which receive a clamping-screw 13.

In applying my invention the shaft is cut in order to provide the driving-shaft 1 and the driven shaft 2. The bushing 6 is fastened upon the driving-shaft, and the collar 3 is fastened upon the driven shaft, with its clamping-fingers extending about the said bushing. The sleeve 8 is now screwed in position, and the clamping-fingers are forced about the bushing 6 in order to produce frictional engagement between the driving and driven parts. When the sleeve 8 has been properly adjusted upon the collar-fingers, the split ring is tightened and the parts are held together. Under ordinary conditions the rotation of the driving-shaft serves to correspondingly rotate the driven shaft through the frictional engagement between the clamping-sections 5 and the bushing 6. If, however, the driven shaft becomes clogged, the driving-shaft rotates within the clamping members 5. The force with which the sleeve 8 engages the clamping members 5 can be regulated not only by the ring 11, but also by means of the tapering surfaces upon the clamping members and the sleeve 8. Should the parts wear to such an extent that the sleeve 8 does not engage the clamping members with sufficient force, the split ring can be loosened and the sleeve 8 screwed farther along the tapering surface 7. The bushing 6 can be readily applied to any shaft, and it is evenly engaged by the clamping-sections 5 at all points about its circumference. Preferably the split clamping-ring is supported upon an annular flange 14, extending about the body portion 10 of the sleeve 8.

I am aware that many minor changes in the construction, arrangement, and combination of the several parts of my device can be made and substituted for those herein shown and described without in the least departing from the nature and principle of my invention.

Having thus described my invention, what I claim as new, and desire to secure by Letters Patent, is—

1. In a shaft-coupling, a driving and a driven shaft in substantially axial alinement, a collar rigidly attached to the periphery of one of said shafts, there being longitudinally-split extensions integral therewith extending beyond the end of said shaft and frictionally engaging the periphery of the other shaft, a second collar slidable on the periphery of said second shaft with longitudinally-split extensions concentric with the first-mentioned extensions and frictionally engaging the periphery thereof, there being screw-threads on both sets of split extensions; substantially as described.

2. In a shaft-coupling, a driving and a driven shaft in substantially axial alinement, a collar rigidly attached upon the circumferential face of one of said shafts, there being longitudinally-split, wedge-shaped extensions integral therewith extending beyond the end of said shaft and frictionally engaging the exterior of the other shaft, a second collar slidable on the said second shaft with longitudinally-split overlapping extensions concentric with the first-mentioned extensions and exterior thereof, there being screw-threads on both sets of split extensions; substantially as described.

3. In a shaft-coupling, a driving and a driven shaft in substantially axial alinement, a collar rigidly attached to the periphery of one of said shafts, there being longitudinally-split extensions integral therewith extending beyond the end of said shaft and frictionally engaging the other shaft, a second collar exterior of the said second shaft with longitudinally-split extensions of both collars concentric with the first-mentioned extensions, there being screw-threads on both sets of split extensions, and a clamping-collar embracing said split extensions; substantially as described.

4. The combination with a driving-shaft, and a driven shaft, of clamping members secured to the exterior of one of said shafts and extending about the other thereof beyond the end of the shaft on which they are secured, a second clamping-sleeve with split extensions on the periphery of the other shaft coöperating with said clamping members to cause them to clamp the shaft about which they lie, and a split ring engaging both split extensions; substantially as described.

5. In a shaft-coupling, a driving and driven shaft whose adjacent ends are in substantially axial alinement, a collar rigidly connected to the periphery of one of said shafts, screw-threaded tapering extensions integral with said collar surrounding the proximate end portion of the second shaft, said extension having longitudinal kerfs therein, a bushing on the periphery of the said shaft within said extensions and in frictional engagement therewith, a second, and internally-screw-threaded sleeve with longitudinal kerfs therein mounted on the periphery of said second shaft and adapted to engage the end portions of said tapering extensions, and a clamping-collar with lateral screw-threaded lugs thereon adapted to secure said parts in their set position; substantially as described.

In testimony whereof I hereunto affix my signature, in the presence of two witnesses, this 8th day of August, 1902.

GEORGE GRAHAM.

Witnesses:
GALES P. MOORE,
GEORGE BAKEWELL.